United States Patent [19]

Tozaki

[11] 3,840,796
[45] Oct. 8, 1974

[54] BOOST CHARGER
[75] Inventor: Kaoru Tozaki, Mito, Japan
[73] Assignee: Kabushiki Kaisha Yunaisu, Tokyo, Japan
[22] Filed: Feb. 7, 1973
[21] Appl. No.: 330,442

[30] Foreign Application Priority Data
Feb. 8, 1972    Japan.............................. 47-14206

[52] U.S. Cl................................... 320/21, 320/39
[51] Int. Cl. .......................................... H02k 7/04
[58] Field of Search............... 320/2, 20, 21, 39, 40, 320/6, 61, 59

[56] References Cited
UNITED STATES PATENTS

| | | | |
|---|---|---|---|
| 3,305,755 | 2/1967 | Walsh | 320/21 X |
| 3,609,502 | 9/1971 | Burkett et al. | 320/39 X |
| 3,614,581 | 10/1971 | Frost | 320/21 X |
| 3,656,046 | 4/1972 | Parke | 320/59 |
| 3,696,286 | 10/1972 | Ule | 320/40 X |

Primary Examiner—J. D. Miller
Assistant Examiner—Robert J. Hickey
Attorney, Agent, or Firm—Hans Berman

[57] ABSTRACT

To charge a battery for a drastically shortened period of time and to prevent the battery from being overcharged, a boost charger cyclically charges the battery through interruption of the supply of a charge current to the battery upon detection of an overall internal resistance of the battery increasing toward the end of each charging period as gases are generated within the cells of the battery as a result of the electrochemical decomposition of an electrolyte of the battery. The supply of the charging voltage to the battery is resumed when the gases have been consumed in the electrodes of the battery and accordingly the overall resistance of the battery has dropped to a predetermined level which is inherent in the battery.

12 Claims, 4 Drawing Figures

BOOST CHARGER

The present invention relates to a boost charger for recharging batteries during short periods.

In the boost charger, an extremely great amount of current flows to the battery during charging, and it is an important requirement to control the gassing which takes place within the cells of the battery toward the end of the charging period or when the battery receives an excess amount of charge. Unless this requirement is fulfilled in an appropriate manner, there will result drying-up of the electrolyte in the battery and a rupture of the cells of the battery under the internal gas pressure. Various overcharge preventive means have accordingly been proposed to control the evolution of gas within the cells of the battery to avoid these problems. A typical example of such overcharge preventive means uses an external charging circuit which is adapted to deliver a charge current in a pulsating form so as to prevent an excess of charge current from flowing to the battery through absorption of the gas in the cells during periods intervening between the pulses or through detection of the charge voltage with use of semiconductor elements. Another example uses, in addition to the plates usually incorporated in the battery, a catalytic electrode of a material to activate the gas generated in the cells so that the internal gas pressure is maintained below an allowable limit. In a sealed nickel-cadmium alkaline battery, the evolution of the gas within the cells can be suppressed through utilization of the oxygen absorptive property of the active material of cadmium on the negative plate of the battery. In this instance, the cadmium is incorporated in the negative electrode in larger quantity than the nickel in the positive electrode so that the oxygen gas is consumed in the negative electrode at a rate higher than the rate at which the hydrogen gas is consumed.

In any of the prior art methods above described, it usually takes about 14 to 16 hours before the batteries are charged to their full capacities although, in some cases, the charging periods can be shortened to 3 to 5 hours.

It is, therefore, an object of the present invention to provide an improved boost charger which is adapted to accomplish the full charging of batteries in a further shortened period and without the risk of the batteries being overcharged.

When current of high density is fed to the battery during charging, layers of gas are deposited together other products of electrolysis on the surfaces of the electrodes and act as insulators on the electrodes, and increase the overall internal resistance of the battery. The present invention proposes to utilize the variation in the total internal resistance of the battery in controlling the gassing within the cells of the battery. In accordance with the present invention, the charge current is cyclically interrupted in response to increase in the total internal resistance of the battery applied again when the gases have been consumed in the electrodes and accordingly the overall internal resistance of the battery has dropped to a predetermined level which is inherent in the battery. These cycles are repeated until the battery is fully charged so that not only the charging of the battery is completed in a shortened period but the overcharge is not invited even in electrolytic cells having small differential potentials at the initial and final stages of the charging period.

The present invention resides in a boost charger for charging a battery having an internal resistance which increases substantially towards the end of the charing period as a result of internally generated gases. It comprises electric energy storage means connected in parallel with said battery. It further comprises charging means having a conductive state and a nonconductive state connected to said storage means for charging said storage means to a predetermined voltage at charging times separated by predetermined time intervals when in said conductive state. These storage means discharge through the battery, thereby charging the battery during the predetermined time intervals at a discharge rate varying inversely with the interal resistance of said battery. Finally, the invention comprises switching means having an input connected to said storage means and an output connected to said charging means for switching said charging means to said non-conductive state when said discharge rate of said storage means is less than a predetermined discharge rate indicative of said increased internal resistance of said battery, whereby charging of said battery is interrupted in response to said increase in said internal resistance of said battery.

Where preferred, the boost charger having the general construction above described may further comprise charge shut-off means having an input terminal connected to the switching means and an output terminal connected to the charge control means and responsive to pulse signals from the switching means and operative to be actuated in response to pulses having pulsewidths exceeding a predetermined value for continuously maintaining the charge control means inoperative to deliver the charge voltage to the capacitor and battery.

Other, features and advantages of the boost charger according to the present invention will become apparent from the following description taken in conjunction with the accompanying drawings, in which.

Figure 1:
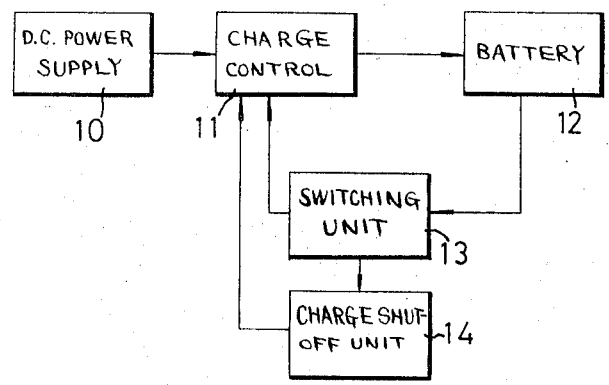
FIG. 1 is a block diagram of the boost charger according to the present invention.

Referring to FIG. 1, the boost charger according to the present invention comprises charging means including a d.c. power supply unit 10 and a charge control unit 11 through which the d.c. power supply unit 10 is connected to a storage battery 12 to be charged. The charge control unit 11 has, in addition to its input terminal connected to the d.c. power supply unit 10, input terminals which are connected to a switching unit 13 and a charge shut-off unit 14. The charge control unit 11 is controlled by the switching unit 13 selectively or cyclically between first and second operational conditions or states depending upon output signals delivered from the switching unit 13. When switched to the first condition, the charge control unit 11 delivers a charge current to the battery 12 and, when shifted to the second operational condition, the charge control unit 11 is blocked and stops the delivery of the charge current to the battery and a capacitor. The switching unit 13 has an input terminal connected to the battery 12 and is responsive to change in the internal resistance of the battery during charging. The change of the internal resistance of the battery 12 occurs during the charging operation as a result of the gassing taking place as the battery receives the charge current. The switching unit 13 is adapted to respond to a change in the internal resistance of the battery 12 and to control the charge control unit 11 to stop the delivery of the charge current in response to the internal resistance exceeding than a predetermined level and to deliver the charge current when the internal resistance of the battery drops below the predetermined level. The battery 12 is thus charged to its full capacity through repetition of these cycles. The fully charged condition of the battery is responded to by the charge shut-off unit or terminating means 14 which has an input terminal connected to the switching unit 13 and an output terminal connected to the charge control unit 11, whereby the charge control unit 11 is caused to trip and become inoperative to deliver the charge current on its output terminal.

Figure 2:
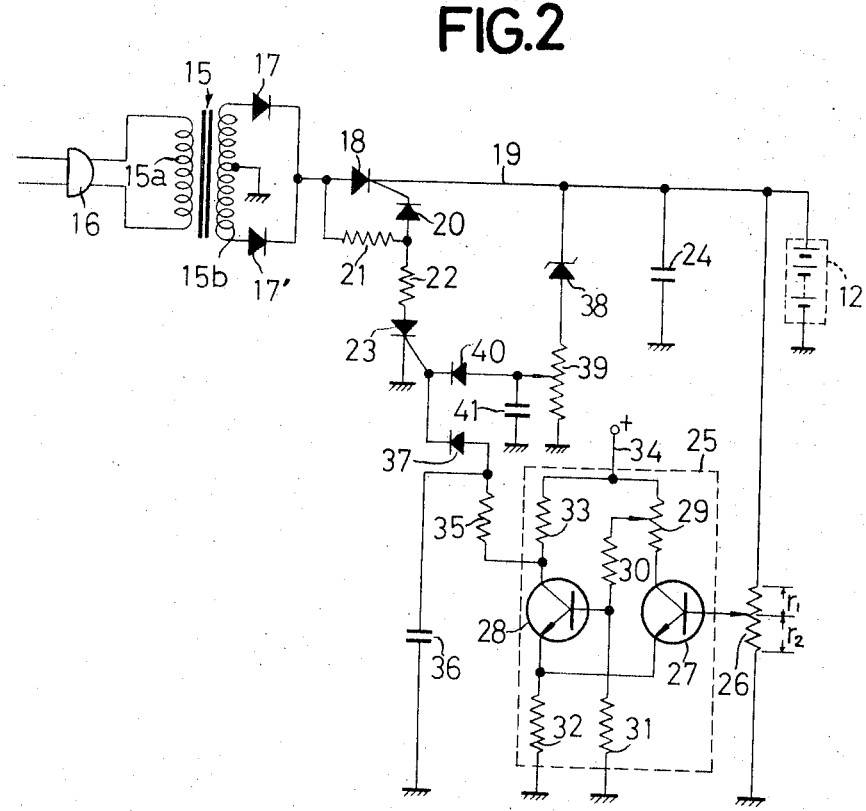
FIG. 2 is a circuit diagram of a first preferred embodiment of the boost charger illustrated in FIG. 1.

FIG. 2 illustrates a preferred circuit arrangement of the boost charger having the general construction above described. Referring to FIG. 2, the d.c. power supply unit is herein shown as comprising a power transformer 15 having a primary winding 15a connected to an a.c. power source 16 and a secondary winding 15b which is connected through semiconductor rectifiers or diodes 17 and 17' to the output terminal of the power supply unit. The d.c. current thus produced by the d.c. power supply unit is fed to the charge control unit which comprises a first silicon controlled rectifier 18 having a cathode terminal connected through a line 19 to the battery 12 to be recharged. The silicon controlled rectifier 18 has an anode terminal connected not only to the output terminal of the d.c. power supply unit but to an anode terminal of a diode 20 through a resistor 21. The diode 20 has a cathode terminal connected to a gate terminal of the silicon controlled rectifier 18 and thus prevents the current from flowing in a reverse direction therethrough from the silicon controlled rectifier 18. The anode terminal of the diode 20 is further connected through a resistor 22 to a second silicon controlled rectifier 23 which has its cathode terminal grounded. SCR 23 is part of switching means which also comprise a bi-stable circuit 25, and is also referred herein as a control means.

The first and second silicon controlled rectifiers 18 and 23, respectively, are alternately rendered conductive by means of the switching means which is responsive to the voltage across storage means, here a capacitor 24. The capcitor 24 is connected in parallel with the battery 12, having one electrode connected to the line 19 and the other electrode grounded. The bistable circuit 25 is a Schmidt trigger circuit which has an input terminal connected to the voltage divider tap of a potentiometer 26 which is connected in parallel with the capacitor 24. The Schmidt circuit 25 comprises first and second transistors 27 and 28. The first transistor 27 has a base connected by the input terminal of the Schmidt circuit 25. The voltage at the base of transistor 27 thus varies as a function of the voltage across the battery.

The first transistor 27 has a collector electrode connected through a potentiometer 29 and a resistor 30 to the base of the second transistor 28, a node between the resistor 30 and the base of the second transistor 28 being connected to ground through a resistor 31. The emitter electrodes of the first and second transistors 27 and 28, are grounded through a resistor 32. Designated by reference numeral 33 is a resistor which is connected between a positive supply terminal 34 and the collector electrode of the second transistor 28. The resistor acts as a load resistance for the transistor 28. The resistors 30 and 31, in particular, are so selected as to be capable of saturating the second transistor 28 when the proper voltage is impressed on the base of the transistor 28.

The potentiometer 26 is so arranged as to make the first transistor 27 conductive and the second transistor 28 non-conductive when the input voltage on the Schmidt circuit 25, viz., the potential on the base of the first transistor 27 reaches a prescribed level. The potentiometer 29, on the other hand, is intended to determine a range of the hysteresis of the input voltage on the Schmidt circuit 25, that is, the time when the first and second transistors 27 and 28 are caused to invert their conditions and are rendered non-conductive and conductive, respectively.

The Schmidt circuit 25 has an output terminal connected to a node between the resistor 33 and the collector electrode of the second transistor 28. The output terminal is connected through a resistor 35 to one electrode of a capacitor 36 whose other electrode is grounded. The resistor 35 is connected through a diode 37 to a gate terminal of the second silicon controlled rectifier 23 of the charge control unit, the diode 37 being intended to prevent a reverse flow of the current from the silicon controlled rectifier 23. The resistor 35 and the capacitor 36 are herein referred to as additional circuit means and form an integrating circuit which dictates the timings at which the second silicon controlled rectifier 23 is triggered in response to an output signal from the Schmidt circuit 25.

The charge shut-off unit includes a constant voltage or Zener diode 38 which is connected in parallel to the battery 12 and the capacitor 24, having a cathode terminal connected to the line 19. The Zener diode 38 has an anode terminal which is connected through a potentiometer 39 and a reverse-flow preventive diode 40 to the gate terminal of the second silicon controlled rectifier 23. The triggering current for the silicon controlled rectifier 23 is supplied from a capacitor 41 which has one electrode connected to a node between the variable resistor 39 and the diode 40 is grounded at the other electrode. The end of the potentiometer 39 is grounded.

The operation of the boost charger having the construction above described will now be set forth.

Figure 3:
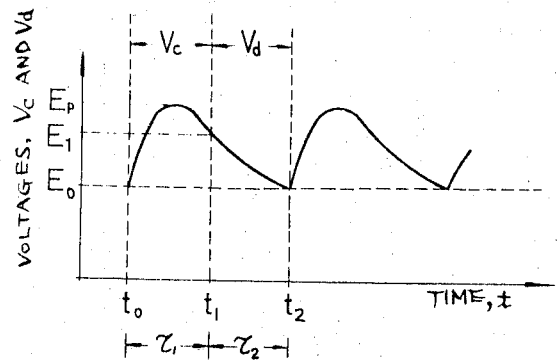
FIG. 3 is a graph showing a waveform of the voltage across the charging capacitor in the boost charger shown in FIG. 2.

The charge voltage is supplied from the d.c. power supply unit 10 in a sinusoidally pulsating form. When the silicon controlled rectifier 18 is conductive, the pulsating charge voltage is fed to the capacitor 24 through the rectifier 18 at a rate which is determined by the resistance $R_t$ of the secondary winding 15b of the power transformer 15 and the capacitance $C_c$ of the capacitor 24. When the voltage across the capacitor 24 reaches the input voltage fed from the silicon controlled rectifier 18 so that the capacitor 24 is charged to its full capacity, the capacitor 24 starts to be discharged so as to charge the battery 12 at a rate which is dictated by the internal resistance $R_b$ of the battery 12 and the capacitance $C_c$ of the capacitor 24. FIG. 3 illustrates a waveform indicating the charge and discharge voltages $V_c$ and $V_d$ across the capacitor 24. As will be seen from the curve of FIG. 3, the capacitor 24 is alternately charged during a period $\tau_1$ between times $t_o$ and $t_1$ and discharged during a period $\tau_2$ between times $t_1$ and $t_2$ in each of its operating cycles. If, in this instance, the peak value of the pulsating charge voltage $V_c$ across the capacitor 24 is $E_p$ and the level of the charge voltage $V_c$ at time $t_o$ is $E_o$ (at which the charging of the capacitor commences), then the charge voltage $V_c$ will be generally defined by the equation $$V_c = (E_p - E_o)(1 - e^{-t/C_c \cdot R_t}) + E_o \quad (1)$$

where $t$ varies between $t_o$ and $t_1$. The charge voltage $V_c$ across the capacitor 24 increases approximately exponentially during the charging period $\tau_1$. When, then, the voltage $V_c$ at time $t_1$ reaches a level which is substantially equal to the peak of the input charge voltage, the silicon controlled rectifier 18 becomes non-conductive whereupon the charges accumulated in the capacitor 24 start to be released from the capacitor and supplied to the battery 12. The battery 12 is thus charged in cycles that are coincident with time periods $\tau_2$ between times $t_1$ and $t_2$ indicated in FIG. 3.

As previously discussed, the water of the electrolyte in the battery 12 is electrochemically decomposed into hydrogen and oxygen toward the ends of the charging periods. The gases are thus generated at a rate increasing in proportion to the amount of electrical energy stored in the capacitor 24 and the increase in the amount of gases, in turn, results in a proportional rise of the internal resistance $R_b$ of the battery 12. Since, thus, the battery 12 is connected in parallel to the capacitor 24, a time constant will be formed by the capacitance $C_c$ of the capacitor 24 and the internal resistance of the battery 12 so that the discharge voltage $V_d$ across the capacitor 24 varies substantially inversely proportionally to the internal resistance $R_b$ of the battery 12. If the level of the discharge voltage $V_d$ across the capacitor 24 at time $t_1$ is $E_1$, then the discharge voltage $V_d$ will decrease from the time $t_1$ at a rate which is defined by the equation $$V_d = (E_1 - E_o)e^{-t-t_1/C_c \cdot R_b} + E_o, \quad (2)$$

so that $$ln(V_d' - E_o) = ln(E_1 - E_o) - \tau 2/C_{cd}R_b \quad (2')$$

wherein $V_d'$ is the voltage across capacitor 24 at time $t_2$. As will be evident from Eq. 2', the charging period $\tau_2$ is given by $$\tau_2 = C_c \cdot R_b \cdot ln\, E_1 - E_o/V_d - E_o . \quad (3)$$

From this it is understood that the voltage is stepped up in the battery 12 in negligibly short cycles of the order of, say, tens of milli-seconds as compared with the discharge rate of the capacitor 24. This will mean that the discharge rate of the capacitor 24 can be deemed as being dependent solely on the amount of internal resistance $R_b$ of the battery 12 on condition that the capacitor 24 has a fixed capacitance. In view, of the fact that the internal resistance $R_b$ of the battery 12 is a sum of an ohmic resistance $r$ inherent in the battery 12 and a polarization or $r'$ which varies with the quantity of the gases evolved in the battery being charged, it may be assumed that the discharge rate of the capacitor 24 depends solely upon the variable discharge resistance $r'$ of the battery 12.

The Schmidt circuit 25 is so arranged that it is turned on by the voltage $V_c$ with which the capacitor 24 is charged and, for this reason, the transistor 27 is made conductive at a timing which is free from the influence of the variation in the total resistance $R_b$ of the battery 12. The transistors 27 and 28 are thus made conductive and non-conductive in accordance with the charge voltage $V_c$ across the capacitor 24.

The first and second transistors 27 and 28 are rendered non-conductive and conductive, respectively, when the discharge voltage $V_d$ across the capacitor 24 drops to the level of $$V_d = V_s(r_1 + r_2)/r_2 - V_h , \quad (4)$$

where $V_s$ is the threshold voltage at the base of transistor 27 at which the Schmidt trigger switches from the first to the second state, $V_h$ is a hysteresis voltage of the circuit 25, which voltage is determined by the set position of the top of the potentiometer. The time $t_h$ at which the first and second transistors 27 and 28 are rendered nonconductive and conductive, respectively, will be given, in view of the relations of Eqs. 2' and 4, from the following expression:

$$ln(r_1 + r_2/r_2 \cdot V_s - V_h) = ln(E_1 - E_o) - t_h/C_c \cdot R_b + ln\, E_o$$

The time period $t_h$ is consequently given by $$t_h = C_c \cdot R_b \cdot ln[(E_1 - E_o)E_o/(r+r_2)/r_2 \cdot V_s - V_h] \quad (5)$$

From this it is understood that the time $t_h$ is proportional to the total internal resistance $R_b$ of the battery 12 and varies as a function of the hysteresis voltage $V_h$ of the Schmidt circuit 25.

It is now assumed that the hysteresis voltage $V_h$ of the Schmidt circuit 25, the resistances of the resistors 33 and 35 and the capacitance of the capacitor 36 are selected in such a manner that the gate terminal of the first silicon controlled rectifier 18 is triggered at a timing which is appreciably retarded from the timing of the gate terminal of the second silicon controlled rectifier 23 being triggered when the potential of the battery 12 approaches the fully charged level and the gassing is about to take place. Under this condition, the time $t_h$ of the condition of the Schmidt circuit 25 being inverted is dictated solely by the amount of internal resistance $R_b$ of the battery 12. Since the internal resistance $R_b$ of the battery 12 increases with the charge resistance $r'$ of the battery as previously discussed, the time $t_h$ causing the inversion of the operating condition of the Schmidt circuit 25 will be retarded a period which is proportional to an increment of the charge resistance $r'$ of the battery. The result is that the first silicon controlled rectifier 18 is triggered at a timing which is later than the timing at which the second silicon controlled rectifier 23 is triggered so that the former is made non-conductive and the latter made conductive. The supply of the charge current to the capacitor 24 is consequently interrupted. The second silicon controlled rectifier 23 becomes non-conductive when the potential of the capacitor 36 drops below the triggering level after Schmidt trigger 25 has switched back to the first state and transistor 28 is again conductive. As a result, the first silicon controlled rectifier 18 becomes conductive for a second time. The battery 12 will be rapidly charged in cycles to its full capacity through alternate repetitions of the above described two different conditions.

The Zener diode 38 of the charge shut-off unit is responsive to the voltage across the capacitor 24 and the internal resistance and potential of the battery 12 and becomes conductive when the Zener voltage of the same is exceeded by a voltage $V_z$ which is defined by the equation $$V_z = (E_1 - E_0) \cdot e^{-\tau_2/C_c \cdot R_b} + E_0. \qquad 6$$

The Zener current is fed through the potentiometer 39 and the diode 40 to the second silicon controlled rectifier 23 so as to trigger the gate terminal thereof with a voltage predetermined by the top position on the potentiometer 39. If, in this instance, the Zener voltage of the Zener diode 38 is so selected as to be equal to the potential of the battery 12 in a fully charged condition, then non-conductive and conductive, Zener diode will be operative to pass the Zener current to the gate terminal of the silicon controlled rectifier 23 so that the second silicon controlled rectifier 23 is rendered conductive and the first silicon controlled rectifier 18 rendered nonconductive when the battery 12 is charged to its full capacity. Under this condition, the capacitor 41 connected between the variable resistor 39 and diode 40 for providing a triggering power source for the second silicon controlled rectifier 23 is continuously charged from the battery 12 so as to maintain the first and second silicon controlled rectifiers 18 and 28 non-conductive, respectively. The charging of the battery 12 is in this manner completed.

Figure 4:
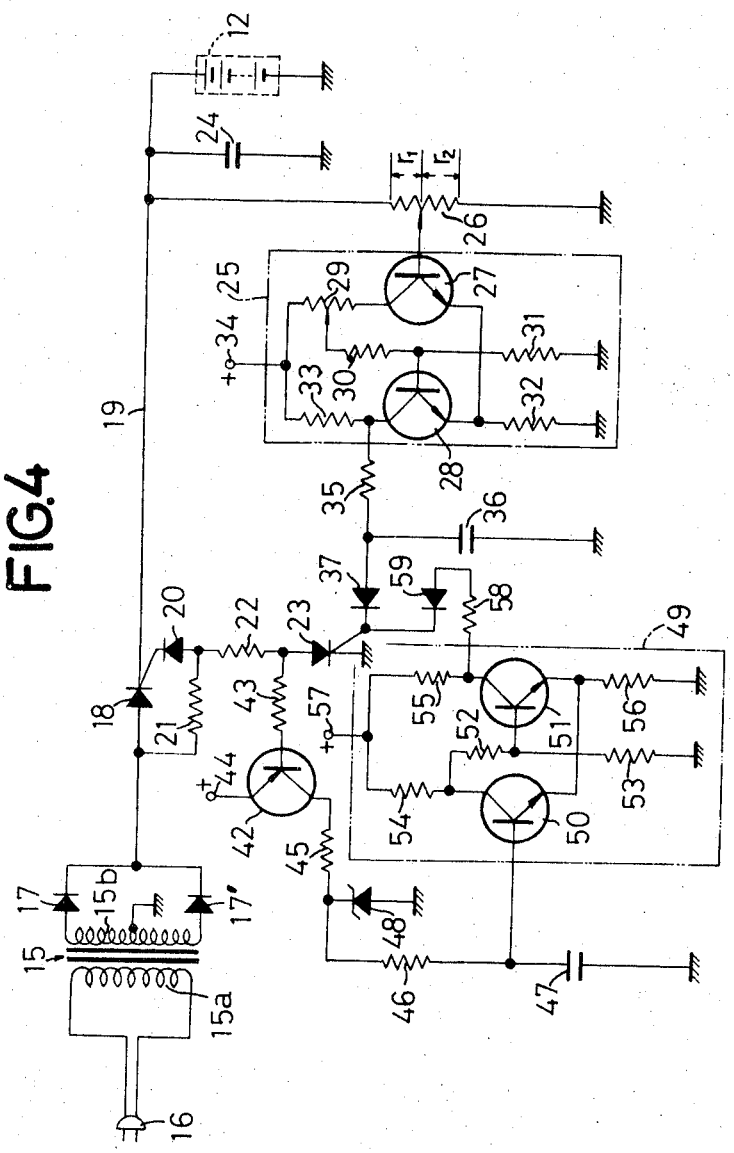
FIG. 4 is a circuit diagram of a modification of the boost charger illustrated in FIG. 2.

FIG. 4 illustrates a modification of the boost charger shown in FIG. 2. The modified embodiment includes d.c. power supply and charge control units shown in FIG. 2, like reference numerals designating corresponding elements in both figures. The modified boost charger shown in FIG. 4 comprises a charge shut-off unit which includes a transistor 42 of the p-n-p junction type having a base connected through a resistor 43 to a node between the resistor 22 and the second silicon controlled rectifier 23 of the charge control unit. The transistor 42 has an emitter electrode connected to a positive supply terminal 44 and a collector electrode serially connected through resistors 45 and 46 to one electrode of a capacitor 47 whose other electrode is grounded. A Zener diode 48 has a cathode terminal connected between the resistors 45 and 46 and an anode terminal grounded. The charge-shut off unit (an alternate terminating means) further includes a Schmidt circuit 49 having an input terminal connected to a node between the resistor 46 and the capacitor 47. The combination of the resistor 46 and capacitor 47 thus constitutes a timing circuit for the Schmidt circuit 49, the input voltage on the timing circuit being stabilized by the combination of the resistor 45 and Zener diode 48.

The Schmidt circuit 49 is constructed essentially similarly to the previously described circuit 25. It includes first and second transistors 50 and 51. The first transistor 50 has a base connected to the input terminal of the Schmidt circuit 49 and accordingly to the node between the resistor 46 and capacitor 47. The collector electrode of the first transistor 50 is connected through a resistor 52 to the base of the second transistor 51 and further through a resistor 53 to ground. The collector electrode of the transistor 50 is, furthermore, connected in parallel with the resistor 52 to the collector electrode of the second transistor 51 through resistors 54 and 55. The emitter electrodes of the transistors 50 and 51 are grounded through a resistor 56. Designated by reference numeral 57 is a terminal which permits to impress an operating voltage on the transistors 50 and 51. The Schmidt circuit 49 has an output terminal leading from a node between the resistor 55 and the collector electrode of the second transistor 51. The output terminal is connected in parallel with the previously described reverse flow preventive diode 37 to the gate of a second silicon controlled rectifier 23 through a resistor 58 and a diode 59 which is also adapted to prevent a reverse flow of the current from the second silicon controlled rectifier 23.

When, in operation, the silicon controlled rectifiers 18 and 23 are made conductive and non-conductive alternately, the battery 12 is charged in cycles from the capacitor 24 which has been charged in preceding cycles from the d.c. power supply unit including the power transformer 15 as previously described. As the second silicon controlled rectifier 23 is cyclically made conductive and non-conductive in the modified embodiment of the boost charger illustrated in FIG. 4, the transistor 42 is also made conductive and non-conductive in cycles so that a pulse train with predetermined voltage levels is supplied to the combined timing circuit of the resistor 46 and the capacitor 47, the pulse train being stabilized by means of the combination of the resistor 45 and Zener diode 48. Transistor 42 constitutes pulse furnishing means while resistor 46 and capacitor 47 constitute an integrating circuit. The pulses thus supplied to the timing circuit are passed on to the Schmidt circuit 49 when the pulsewidths thereof exceed a predetermined value which depends upon the time constant of the timing circuit. When, in this instance, the battery 12 is being charged from the capacitor 24, the second silicon controlled rectifier 23 is made conductive for relatively short period as previously explained, the pulsewidths of the pulse train fed to the timing circuit of the resistor 46 and capacitor 47 are short of the predetermined value so that the Schmidt circuit 49 remains inoperative to continuously deliver stabilized voltages at its output terminal. Upon completion of the charging of the battery 12, however, the time constant of the timing circuit of the resistor 46 and capacitor 47 is varied in consequence of the gassing in the battery 12 so that the Schmidt circuit 49 continuously issues pulse voltages of prolonged durations so that the second silicon controlled rectifier 23 is cyclically kept conductive for prolonged periods of time.

When the second silicon controlled rectifier 23 is thus rendered conductive, the transistor 42 remains conductive so that the combination of the resistor 45 and Zener diode 48 is operative to produce square-wave pulses. Assuming these square-wave pulses to have pulsewidths of W, there will hold a relationship $$W \propto T_c(r + r')ln(V_c - E_0/V_d - E_0).$$

The pulses having these pulsewidths are integrated by the timing circuit of the resistor 47 and capacitor 46. When the second silicon controlled rectifier 23 is made conductive in the prolonged durations as previously noted, the charging voltage across the capacitor 47 exceeds a predetermined threshold voltage level of the Schmidt circuit 49 for holding the first and second transistors 50 and 51 of the circuit conductive and non-conductive, respectively. The circuit 49 thus delivers the output voltage at its output terminal connected through the resistor 58 to the second silicon controlled rectifier 23 which is as a consequence made continuously conductive. Under this condition, the first silicon controlled rectifier 18 is continuously kept non-conductive with the result that the supply of the charging current to the battery 12 ceases. The re-charging of the battery 12 is in this manner completed.

As an alternative to the Schmidt circuit 49 in the above described charge shut-off circuit, a Zener diode may be incorporated therein so that the Zener diode is made conductive and accordingly the second silicon controlled rectifier 23 also made conductive when the level of the output voltage from the timing circuit comprising the resistor 46 and capacitor 47 exceeds the Zener voltage of the Zener diode.

What is claimed is:

1. A boost charger for charging a battery having an internal resistance increasing substantially towards the end of the charging period as a result of internally generated gases, comprising, in combination:
   a. storage means for storing electrical energy, said storage means being connected in parallel with said battery;
   b. charging means having a conductive state and a non-conductive state and connected to said storage means for charging said storage means to a predetermined voltage during charging times separated by predetermined time intervals when in said conductive state,
      1. said storage means discharging through said battery, thereby charging said battery during said predetermined time intervals at discharge rates varying inversely with said internal resistance of said battery; and
   c. switching means having an input connected to said storage means and an output connected to said charging means for switching said charging means to said non-conductive state when said discharge rate of said storage means is less than a predetermined discharge rate indicative of said increased internal resistance of said battery, whereby charging of said battery is interrupted in response to said increase in said internal resistance of said battery.

2. A boost charger as set forth in claim 1, wherein said storage means comprise a capacitor.

3. A boost charger as set forth in claim 1, wherein said switching means comprise bistable circuit means having an input connected to said capacitor and an output, for switching from a first to a second state when the voltage across the capacitor increases above a first predetermined voltage and from said second to said first state when said voltage across said capacitor decreases below a second predetermined voltage, and for furnishing an output signal while in said second state; additional circuit means connected to said output of said bistable circuit means for furnishing a timing signal varying as a predetermined function of time in response to said output signal; and control means connected to said additional circuit means and said charging means for switching said charging means to said non-conductive state when said timing signals exceed a predetermined timing signal indicative of a discharge rate less than said predetermined discharge rate.

4. A boost charger as set forth in claim 3, wherein said bistable circuit means comprise a Schmidt trigger circuit.

5. A boost charger as set forth in claim 4, wherein said additional circuit means comprise an integrating circuit.

6. A boost charger as set forth in claim 5, wherein said integrating circuit comprises a resistor-capacitor circuit connected to said bistable circuit means in such a manner that said capacitor charges while said bistable circuit means is in said second state and discharges while said bistable circuit means is in said first state.

7. A boost charger as set forth in claim 6, wherein said charging means comprise a source of pulsating DC voltage, and a first silicon-controlled rectifier having an anode-cathode circuit connected between said source of DC voltage and said capacitor and a gate; and wherein said control means comprise a second silicon-controlled rectifier having a gate connected to said capacitor of said resistor-capacitor circuit and an anode-cathode circuit connected to said gate of said first silicon-controlled rectifier in such a manner that said first silicon-controlled rectifier is conductive and non-conductive when said second silicon-controlled rectifier is non-conductive and conductive, respectively.

8. A boost charger as set forth in claim 2, further comprising terminating means for terminating the charging of said battery when the voltage across said battery exceeds a predetermined voltage indicative of a fully charged battery.

9. A charger as set forth in claim 8, wherein said terminating means comprise a threshold circuit connected in parallel with said battery for furnishing a threshold signal when said battery voltage exceeds said predetermined voltage; and means interconnecting said threshold circuit with said switching means in such a manner that said switching means switches said charging means to said non-conductive state in response to said threshold signal.

10. A boost charger as set forth in claim 8, wherein said control means has a conductive and a non-conductive state; wherein said charging means has said conductive state only when said control means is in said non-conductive state; and wherein said terminating means comprise bistable circuit means having an output connected to said control means and an input, and adapted to switch from a first to a second state in response to a switching signal, for furnishing an output signal at said output when in said second state, means for connecting said output to said control means in such a manner that said output signal switches said control means to said conductive state, pulse furnishing means connected to said control means for furnishing pulses having a pulse width corresponding to the time said control means is in said conductive state, and integrating circuit means interconnected between said pulse furnishing means and said bistable circuit means for furnishing said switching signal to said bistable circuit means when said pulse width of said pulses exceeds a predetermined pulse width.

11. A boost charger as set forth in claim 10, wherein said bistable circuit means of said terminating means comprise a Schmidt trigger circuit.

12. A boost charger as set forth in claim 10, wherein said pulse furnishing means comprise a transistor having an emitter-collecter circuit and a gate, means for connecting said gate of said transistor to said control means in such a manner that said transistor is conductive when said control means is in said conductive state, and a Zener diode connected to said emitter-collecter circuit for stabilizing the amplitude of said pulses; and wherein said integrating circuit means comprise a resistor-capacitor circuit connected to said emitter-collecter circuit of said transistor.

* * * * *